Nov. 29, 1966 N. LAING 3,288,356
ROTOR AND METHOD OF MAKING SAME
Original Filed Feb. 15, 1961 3 Sheets-Sheet 1
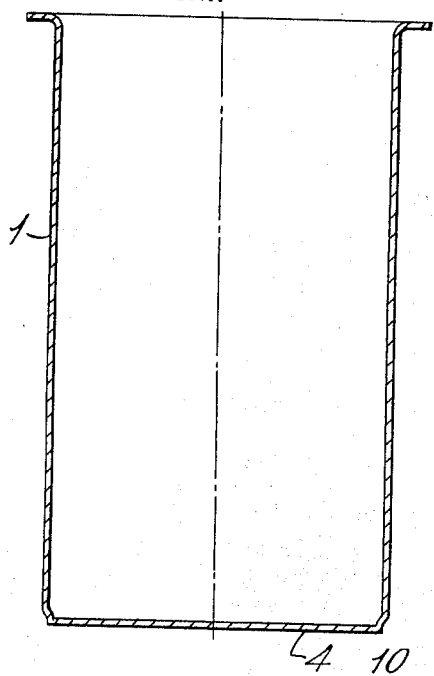
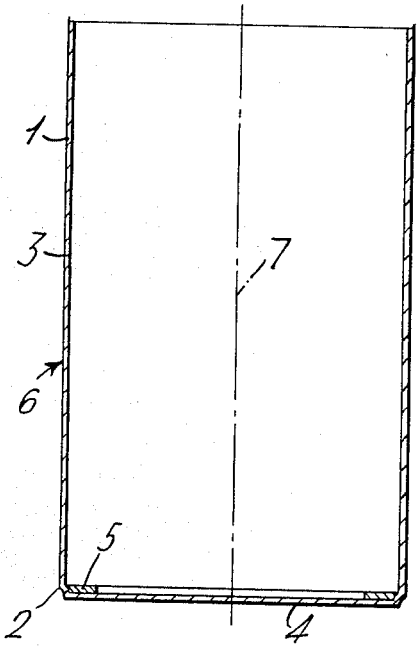
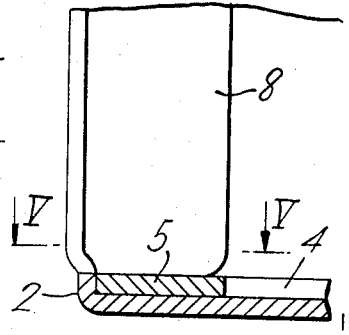
INVENTOR
Nikolaus Laing
BY
ATTORNEYS

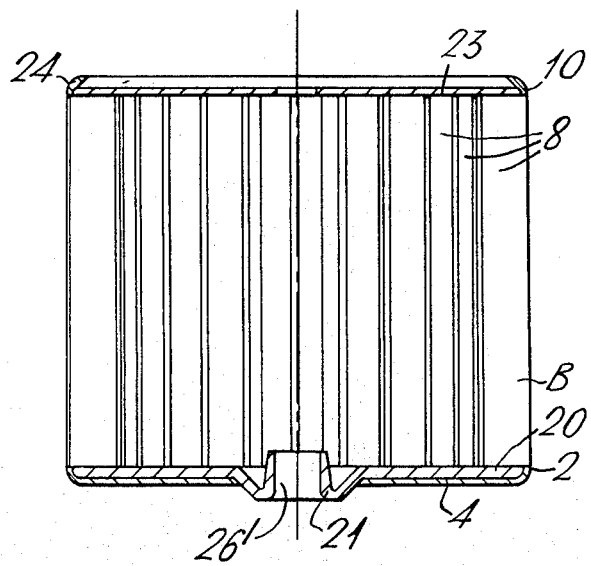
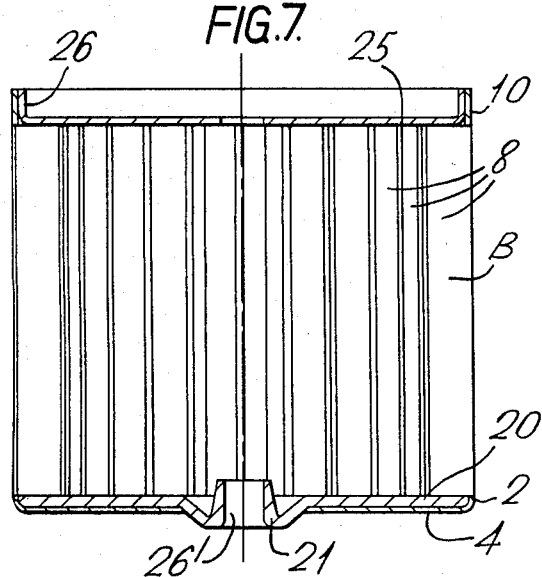

Nov. 29, 1966 N. LAING 3,288,356
ROTOR AND METHOD OF MAKING SAME
Original Filed Feb. 15, 1961 3 Sheets-Sheet 3
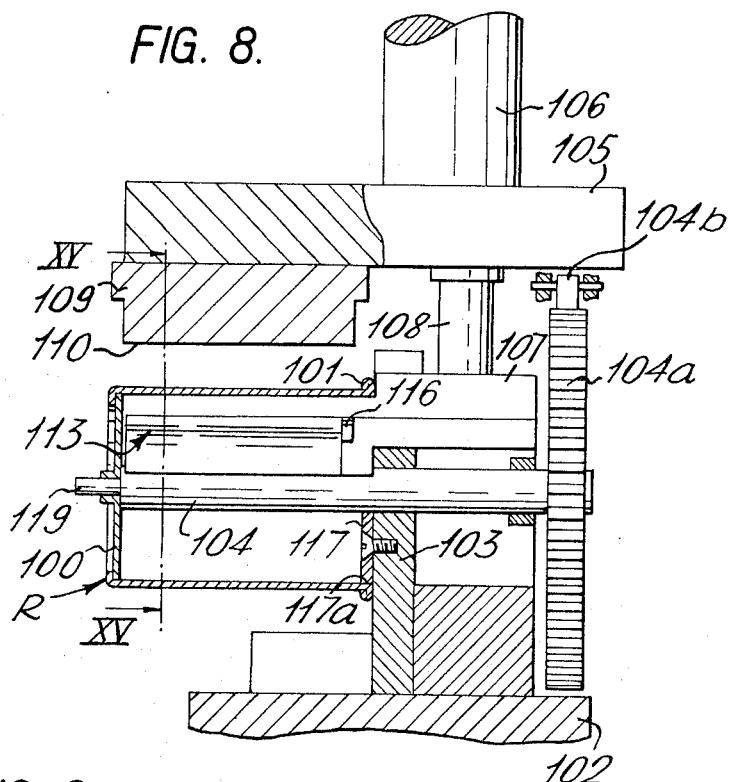
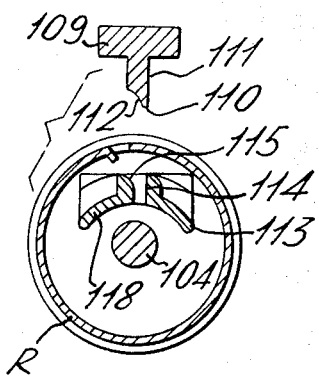
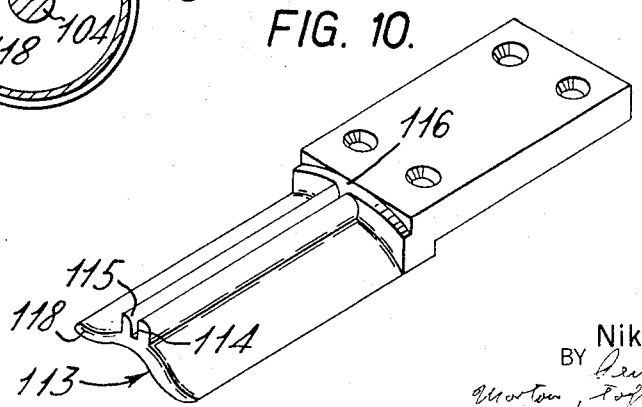
INVENTOR
Nikolaus Laing
BY
ATTORNEYS United States Patent Office 3,288,356

Patented Nov. 29, 1966

1

3,288,356

ROTOR AND METHOD OF MAKING SAME

Nikolaus Laing, Stuttgart, Germany, assignor, by mesne assignments, to Laing Vortex, Inc., New York, N.Y.

Original application Feb. 15, 1961, Ser. No. 89,547, now Patent No. 3,199,179, dated Aug. 10, 1965. Divided and this application July 26, 1965, Ser. No. 474,873
Claims priority, application Germany, Feb. 15, 1960, L 35,371
1 Claim. (Cl. 230—134)

This invention relates to bladed cylindrical rotors for fluid flow machines of the cross-flow type; this application is a division of my copending application Serial No. 89,547 filed February 15, 1961.

A fluid flow machine of the cross-flow type is understood herein to comprise a cylindrical bladed rotor and guide means co-operating therewith on rotation of the rotor in a predetermined direction to induce a flow of fluid from a suction side of the rotor through the path of the rotating blades to the interior of the rotor and thence again through the path of the rotating blades to a pressure side of the rotor.

Examples of cross-flow fluid machines may be found in U.S. Patent 2,942,773 and British Patent 876,611.

Though in certain cases it is required that a proportion of the total flow should enter the rotor through one or both ends, in general in a cross flow fluid machine flow takes place in planes transverse to the rotor axis, and means are provided to prevent any substantial amount of endwise flow into the rotor. Usually such means will consist of imperforate end members of the rotor. Because of the way in which flow takes place there is no theoretical limit on the length of a rotor for a cross-flow machine: normally long rotors will have to be supported by rotatably mounting both ends.

Small cross-flow fans are commonly used as, or in, items of domestic equipment, e.g., a fan heater. Such fans, and their component parts, must be designed for economic quantity production. The general object of the invention is to provide a rotor for a cross flow fluid machine which satisfies this requirement.

A rotor component comprising one end member and a series of blades can be formed economically e.g. in one piece by extruding or deep-drawing a pot and forming the blades from the cylindrical walls. However it will be appreciated from the foregoing that such a component would not ordinarily provide a satisfactory rotor for a cross-flow machine. Generally it would be required to provide such a component with a second end member, whether to form an end closure, or to provide for rotatably mounting that end of the rotor, or for both purposes. The invention is more particularly concerned with a cross-flow rotor comprising one end member and a series of blades, and a second end member assembled with such component: the invention includes also a method of making such a rotor.

In its broad aspect, the invention provides, for a cross-flow fluid machine, a rotor comprising first and second end portions at opposite ends, a series of blades arranged in a ring about and extending generally longitudinally between and interconnecting said end portions and being supported thereby, the second end portion having the form of an open-ended annulus and the blades extending inwardly thereof, and an end member received within the said second end portion and seated upon the blades. The first and second end portions are conveniently, but not necessarily, provided by a one-piece component such as referred to above. The end member may be simply a push fit within the second end portion, or the end portion may be spun over to lock it in place. The end member will normally, though not necessarily, be effective as a closure member for that end of the rotor. The end member may be provided with means (e.g., a central hole or boss) for connection to a supporting shaft.

In its broad method aspect the invention comprises the steps of forming an integral pot having a bottom end portion and a generally cylindrical wall, forming in the generally cylindrical wall parallel to the axis of the pot and intermediate the bottom end portion and a top wall portion a series of rotor blades whose inner edges lie inwards of said top wall portion, and inserting a top end member within the top wall portion into seating engagement on said blades.

The invention will be further described with reference to the accompanying drawings in which:

FIGURES 1, 2 and 3 are axial sections illustrating three stages in the formation of a rotor component, FIGURE 3 being an axial section only to the right of the centre line and being a side elevation to the left thereof;

FIGURES 4 and 5 are portions respectively of an axial and of a transverse section of the rotor component in the stage of FIGURE 3, the section lines of each figure being indicated in the other by the lines IV—IV, V—V respectively the section line V—V being also shown in FIGURE 3;

FIGURES 6 and 7 are axial sections of two rotors according to the invention, illustrating two ways of assembling an end member with a rotor component similar to that of previous figures; and FIGURES 8, 9 and 10 illustrate a known form of punching machine modified to perform certain of the steps in the method by which a rotor component similar to that of FIGURES 1 to 3 may be produced, FIGURE 8 being an axial section of the machine with rotor component in position, FIGURE 9 being a transverse section of the machine and component thereon, and FIGURE 10 showing a part of the machine in perspective view.

Referring to the drawings, FIGURE 1 shows a cylindrical pot 1 produced for example by drawing from ductile sheet metal; alternatively an extrusion moulding process could be used. It will be seen that in the course of the drawing or extrusion process the portion 2 of the cylindrical wall 3 of the pot 1 adjacent its bottom 4 is displaced inwardly of the main part of this wall by a distance about equal to the wall thickness. A relatively rigid supporting ring 5 is inserted into the pot 1 to bring one face against the bottom 4 of the pot and its outer periphery against the inside of the wall portion 2. As more fully explained with reference to FIGURES 8 to 10, a knife or a similar tool is then presented to the cylindrical wall 3 in the direction indicated by arrow 6 with its cutting edge extending and remaining parallel with the cylinder axis 7. The cylindrical wall 3 is cut through over its whole length except for the portion 2 and a portion 10 at the top of the pot (FIGURE 3) and the segments of the cylindrical wall 5 between adjacent cuts are displaced into the interior of the pot. The ring 5 supporting the wall portion 2 and an appropriate portion of the tool supporting the top wall portion 10 form backing members which ensure that the sheet metal is cleanly severed at the top and the bottom and that cylindricity is maintained. This operation produces a series of inwardly deflected blades 8 (FIGURE 3), adjacent blades defining ducts 9.

As will be more fully explained below the blades 8 can be formed by advancing the pot 1 angularly and intermittently through a punching station wherein a punch movable radially outside of the pot co-operate with a die extending within it and supported in the manner of a cantilever. One blade is formed on each complete reciprocation of the punch and the pot then indexed to the correct position for forming the next blade, until all the blades have been formed.

It will be seen that the blades 8 are twisted inwardly as they are sheared out of the wall 3 of the pot. Over the central, and major, part of their length the blades 8 have the shape indicated at 11 in FIGURE 5. The blades 8 are joined at their top and bottom ends to the cylindrical wall portions 10 and 2 respectively by short transition portions 12 which merge into those wall portions and accommodate the twist, the bottom transition portions 12 also accommodate the reduction in overall diameter which gives rise to the inward displacement of the bottom wall portion 2.

For the sake of clarity these portions are only shown on the large-scale figures of the drawing.

The formation of the blades 8 will now be further described with reference to FIGURES 8, 9 and 10 which illustrate a known form of punching machine modified to perform the blade cutting and twisting steps previously mentioned. The rotor component R shown in course of manufacture in FIGURE 8 differs somewhat from that of FIGURES 1 to 5 in that the bottom portion of the cylindrical wall is not inwardly displaced as shown in the latter figures and instead of the supporting ring 5 there shown a centrally apertured disc 100 is employed. The component R resembles in these respects the rotor of FIGURE 6, to be discussed later. The rotor component R has a flange 101 at its open end as shown in FIGURE 1.

The punching machine of FIGURES 8, 9 and 10 has a substantial base 102 supporting a vertical face plate 103 and a stout horizontal rotatable work support shaft 104. A toothed indexing wheel 104a is keyed on the shaft 104 and co-operates with locating means 104b. Above the base 102, a punch carrier 105 is mounted for vertical reciprocation under the control of a plunger 106. A die carrier 107 is mounted, with the aid of vertical rods 108, for vertical reciprocation in timed relation with the movement of the punch carrier, as will appear.

The punch carrier 105 mounts a punch 109 having a knife edge 110 extending parallel to the axis of the work support shaft 104 over the whole length of the rotor component R between the flange 101 at one end of the rotor and the supporting disc 100 at the other. The knife edge 110 is defined by a plane face 111 at one side and a face 112 on the other which is concave in cross-section (as seen in FIGURE 9) and complementary to the desired form of a rotor blade 8 as seen in cross-section. The die carrier 107 mounts a die 113 which extends within the rotor component R and presents vertical and arcuate surfaces 114, 115 respectively opopsite to and cooperating with the punch surfaces 111, 112. The die 113 also provides an arcuate support edge 116 which lies against the upper part of the inside of the flange 101 during punching. A fixed plate 117 secured to the face plate 103 provides a support edge 117a for the remainder of the inside of the flange 101. The die 113 further includes a support ledge 118 which underlies the formed blades during each punching step.

In operation, the rotor component R, in the form of a drawn pot with a plain cylindrical side wall and having the supporting disc 100 inserted, is assembled over the work support shaft 104 with the flanged end located against the face plate 103 on the support edge 117a provided by the plate 117 and the supporting disc received on a reduced end portion 119 of the support shaft. The disc 104 is caused to rotate with the support shaft during punching. Before each punching step, the die 113 is brought up to abut against the inside of the rotor component R. The punch 109 then descends and severs the cylindrical wall of the rotor component R along a generator thereof by the action of the knife edge 110 against the closely adjacent die surface 114. Further downward movement of the punch 109 progressively severs the wall circumferentially at the ends of the cut made by the knife edge 110, by reason of the co-operation of the ends of the punch with the support edge 116 and the corresponding edge provided by the supporting disc 100, which in turn is backed up by the support shaft 104. During this downward movement of the punch 109, the portion of the wall adjacent the cut is bent down and formed by co-operating surfaces 112, 115 into the desired blade configuration. The surfaces 112, 115 are relieved near their ends to provide the transition portions 12 previously referred to.

After one punching step, the punch 109 rises and the die 113 drops, and the indexing wheel 104a is rotated an angular distance equal to that separating adjacent blades in the completed rotor, and takes the rotor component R with it. A further punching operation then follows on an adjacent portion of the side wall of the rotor. The sequence of operations is then repeated until all the blades are formed whereupon the completed rotor component is removed from the punching machine.

The inward twisting of the blades 8 lock the support ring 5 between the lower edges of the bottom transition portions 12 of the blades 8 and the bottom 4 of the pot.

For optimum performance, cross-flow rotors must in operation be closed at either end. While this can be done by stationary means at one or both ends it is often more convenient to provide end closures which rotate with the rotor; one or both of such end closures can then be used to support the rotor on a shaft.

FIGURES 6 and 7 show two ways of closing the ends of a rotor. In each case a rotor component designated generally B is formed as described with reference to FIGURES 1 to 5, except that the bottom cylindrical wall portion 2 is not displaced inwardly and instead of the support ring 5 a disc 20 is locked between the bottom 4 of the pot and the lower edges of the blades 8. This disc 20 is formed with an integral shaft-receiving boss 21 extending in part through a central hole in the bottom 4.

In FIGURE 6 a disc 23 is shown which is a push fit in the upper cylindrical wall portion 10 and which is brought into seating engagement against the tops of the blades 8. The wall portion 10 is thereafter spun over as shown at 24 to lock the disc 23 in position.

In FIGURE 7 is shown a dished disc 25 presenting an annular axially and upwardly extending flange 26 in area contact with the wall portion 10. This disc 25 is once again a push fit in the upper cylindrical portion 10 of the rotor body B and is brought into seating engagement against the tops of the blades 8. In this case friction is relied upon to hold the disc in position.

In each case the disc 23 or 25 is centrally apertured at 26' for the passage of a supporting shaft, so that the rotor can be rotatably supported at both ends.

I claim:

For a cross-flow fluid machine having a bladed cylindrical rotor wherein flow of fluid in said machine passes from an intake side thereof through the path of the rotating blades to the interior of the rotor and thence again through the path of the rotating blades to a delivery side thereof, said rotor comprising first and second end portions at opposite ends of said rotor; a plurality of blades arranged in a ring about and extending generally longitudinally between and being unitary with said end portions with said blades having free radially inwardly extending edge portions, the outer edges of said blades defining a cylindrical envelope, said first end portion having the form of a first end closure substantially closing the entire one end of said rotor, and said second end portion having the form of an open-ended annulus within the blade envelope; and a second end closure substantially closing the entire other end of said rotor secured within said second end portion and seated upon said free radially inwardly extending edge portions.

(References on following page)

References Cited by the Examiner

UNITED STATES PATENTS

| | | |
|---|---|---|
| 1,255,661 | 2/1918 | Stewart. |
| 2,272,695 | 2/1942 | Evans _____ 230—134(.5) |
| 2,875,625 | 3/1959 | Scholtz _____ 74—230.8 |

FOREIGN PATENTS 156,976   1/1921   Great Britain.

MARK NEWMAN, *Primary Examiner.*

HENRY F. RADUAZO, *Examiner.*